United States Patent [19]

Chen

[11] Patent Number: 5,314,586
[45] Date of Patent: May 24, 1994

[54] PURIFYING AND ENERGY-SAVING WATER FOUNTAIN CAPABLE OF SUPPLYING ICY, WARM AND HOT DISTILLED WATER

[76] Inventor: Chan-Ming Chen, 1F, No. 16, Alley 3, Lane 80, Sec. 4, Min-Sheng E. Rd., Taipei, Taiwan

[21] Appl. No.: 962,114

[22] Filed: Oct. 16, 1992

[51] Int. Cl.$^5$ ............................ B01D 3/02; C02F 1/04
[52] U.S. Cl. ............................ 202/177; 202/180; 202/202; 62/3.64; 62/3.7; 203/10; 203/22; 203/25; 203/DIG. 4; 203/DIG. 16
[58] Field of Search ............ 203/10, 25, 11, 22, 203/DIG. 16, DIG. 4; 202/177, 180, 202; 62/3.64, 3.7

[56] References Cited

U.S. PATENT DOCUMENTS

| | | | |
|---|---|---|---|
| 3,008,299 | 11/1961 | Sheckler | 62/3.64 |
| 3,055,810 | 9/1962 | Skow | 202/202 |
| 3,212,999 | 10/1965 | Sommers | 203/100 |
| 3,393,130 | 7/1968 | Meckler | 62/3.7 |
| 3,444,050 | 5/1969 | Sundquist | 202/202 |
| 3,506,543 | 4/1970 | Hayes et al. | 203/22 |
| 3,642,583 | 2/1972 | Greenberg et al. | 203/100 |
| 3,975,241 | 8/1976 | Smith | 202/202 |
| 4,316,774 | 2/1982 | Trusch | 203/11 |
| 4,384,512 | 5/1983 | Keith | 62/3.64 |
| 4,687,550 | 8/1987 | Wong | 202/202 |

Primary Examiner—Wilbur Bascomb, Jr.
Attorney, Agent, or Firm—Cushman, Darby & Cushman

[57] ABSTRACT

A distilled water fountain which is capable of supplying the users with purified icy, warm and hot drinking water and composed of a pre-heating exchanger, a condensing-and-heating exchanger, a distilled water tank, a steam generator, and an electronic chilling device. Running water flows into the pre-heating exchanger through water intake pipe, and further flows through the condensing-and-heating exchange into a steam generator wherein the water is vaporized and then condensed into distilled water for storage in the distilled water tank. The distilled water may be made available directly in warm water condition, or may be cooled into icy water through electronic chilling device, or heated into hot water through steam generator for drinking by users.

2 Claims, 3 Drawing Sheets

PURIFYING AND ENERGY-SAVING WATER FOUNTAIN CAPABLE OF SUPPLYING ICY, WARM AND HOT DISTILLED WATER

BACKGROUND OF TECHNOLOGY

In this civilized society, economic prosperity have resulted in harmful pollution to the environment in general, especially the pollution in the quality of water which has been getting worse and worse day after day to the extent of seriously threatening the sources of water needed by human beings and substantially affecting the health of human beings. Although a variety of types of water filters and water fountains are available on the markets, they are different in functions, and none of them can satisfy all the requirements in differently polluted environments. In addition, due to the consumers' lack of common knowledge of maintenance, such devices would, in most times, eventually become the hot-bed of bacteria and useless. In view of these discrepancies, the design of this purifying and energy-saving water fountain capable of supplying icy, warm and hot distilled water (hereinafter referred to as "Purified and Distilled Water Fountain") is created to meet actual requirements.

Presently, "distilled water" is the purest water generally recognized by the peoples around the world. The drinking water to be supplied by the "Purified and Distilled Water Fountain" of this invention is the very distilled water needed by human beings and free from pollutants. Therefore, the purpose of this invention is to develop a novel distilled water fountain to overcome the above-mentioned shortcomings.

SUMMARY OF INVENTION

According to this invention, the softened water or running water from the intake pipe will first flow though a pre-heating exchanger wherein the water temperature will increase to about 30° C.; and secondly flow through a condensing-and-heating exchanger wherein the water temperature will increase to the level above 90° C. The water in the steam generator will be vaporized into steam having a temperature over 100° C. The steam will be sent back to the condensing-and-heating exchanger and condensed into distilled water having a temperature of about 30° C. The distilled water will flow into a water tank for storage before use. Since the temperature of the softened water has increased to a level above 90° C. after the water comes out from the condensing-and-heating exchanger, therefore, it requires not too much heating energy to vaporize the water in the steam generator, and thus a considerable amount of energy can be saved.

The water in the water tank is the ordinary warm water which is available for drinking as it is, and can be reheated by the steam generator to the temperature above 95° C. for use in making tea, coffee or hot milk, or can be chilled by the electronic chilling device to the temperature between 7° C. and 12° C. for drinking by users. The heat energy absorbed from the hot water undergoing chilling process in the chilling device can be used to pre-heat the softened water in the first heat exchanger.

From the above description, it may be appreciated that this invention is indeed a perfect water fountain created for use in modern living.

DETAILED DESCRIPTION OF THE INVENTION

A more complete understanding of the objective, features and advantages of this invention will be obtained by making reference to the following descriptions and the Figures.

Figure 1:
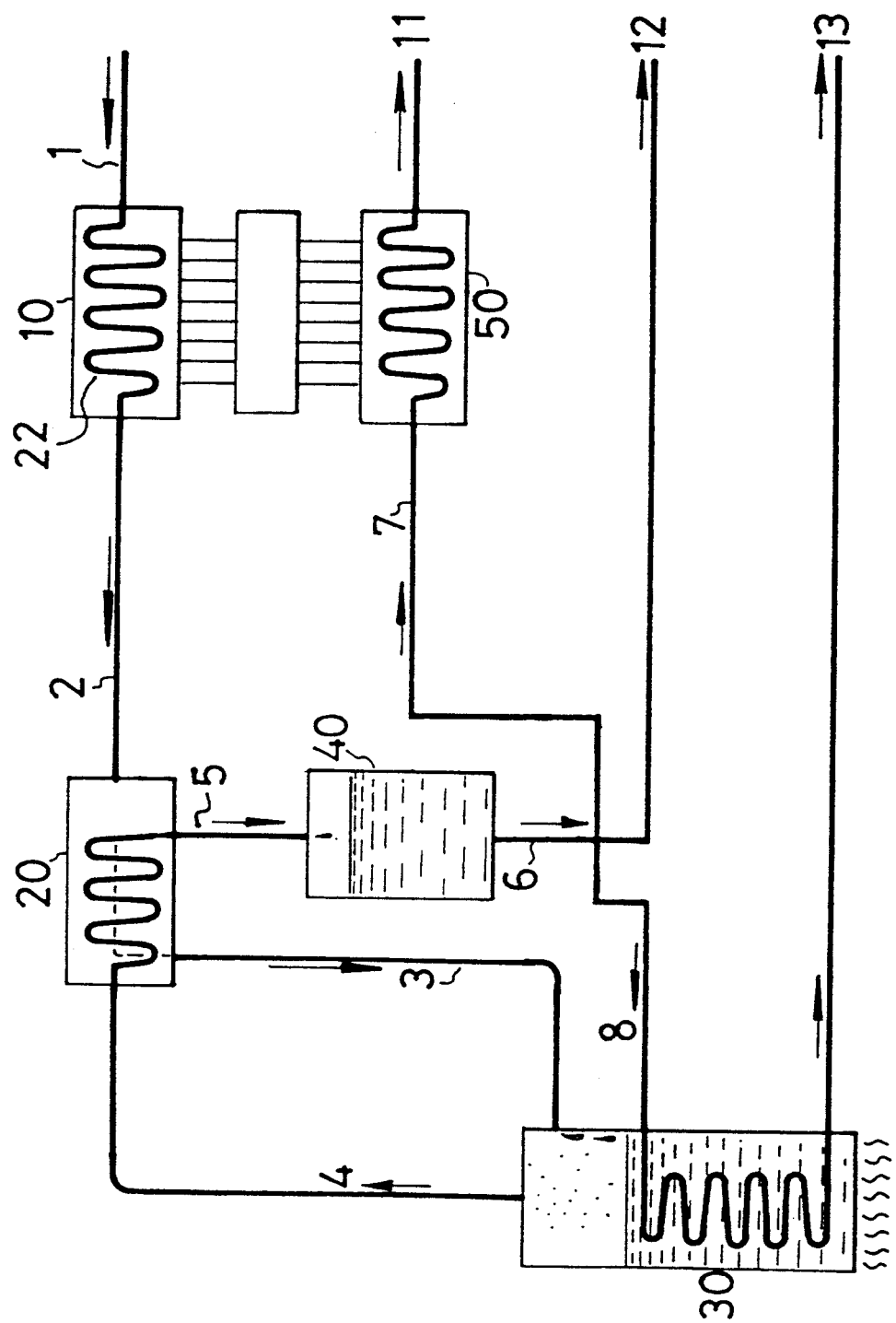
FIG. 1 is a schematic diagram of the pipeline layout of this invention.

Referring to FIG. 1, in which the softened running water flows into the pre-heating exchanger 10 through water pipe 1. The water is heated in the pre-heating exchanger 10 to a temperature about 30° C. before flowing, through pipe 2, into the condensing-and-heating exchanger 20 in which the water is heated to a temperature over 90° C. The water will then flow, through pipe 3, into the steam generator 30 in which the water is further heated and vaporized into steam having a temperature over 100° C. The steam will then be piped back, through pipe 4, into the condensing-and-heating exchanger 20 in which a heat-exchange process will be effected between the steam and the softened water flowing in through pipe 2. The steam will be condensed into distilled water at a temperature about 30° C. and then flow, through pipe 5, into the distilled water storage tank 40 ready for use.

The warm water in the distilled water storage tank 40 may be let out through pipe 6 and then flow out through the warm water pipe 12 for direct drinking by users. The warm water let out through pipe 6 may also flow, through pipe 8, into steam generator 30 undergoing heat exchange process and reheating to raise its temperature to 95° C. and then flow out through pipe 13 for the user to make tea, coffee or hot milk. The heat exchanging pipeline from pipe 8 installed in the steam generator 30 is submerged in the water inside the steam generator 30, i.e., the submerged pipe heating method is adapted in the invention; therefore, the water being heated in the pipeline will not vaporize, thus will not cause any threat of danger.

In addition, the distilled water in the distilled water storage tank 40 may, after being let out through pipe 6, also flow, through pipe 7, into the electronic chilling device 50 in which the water is chilled to a low temperature between 7° C. and 12° C. and then flow out through the icy water outlet pipe 11 for drinking by users.

Figure 2:
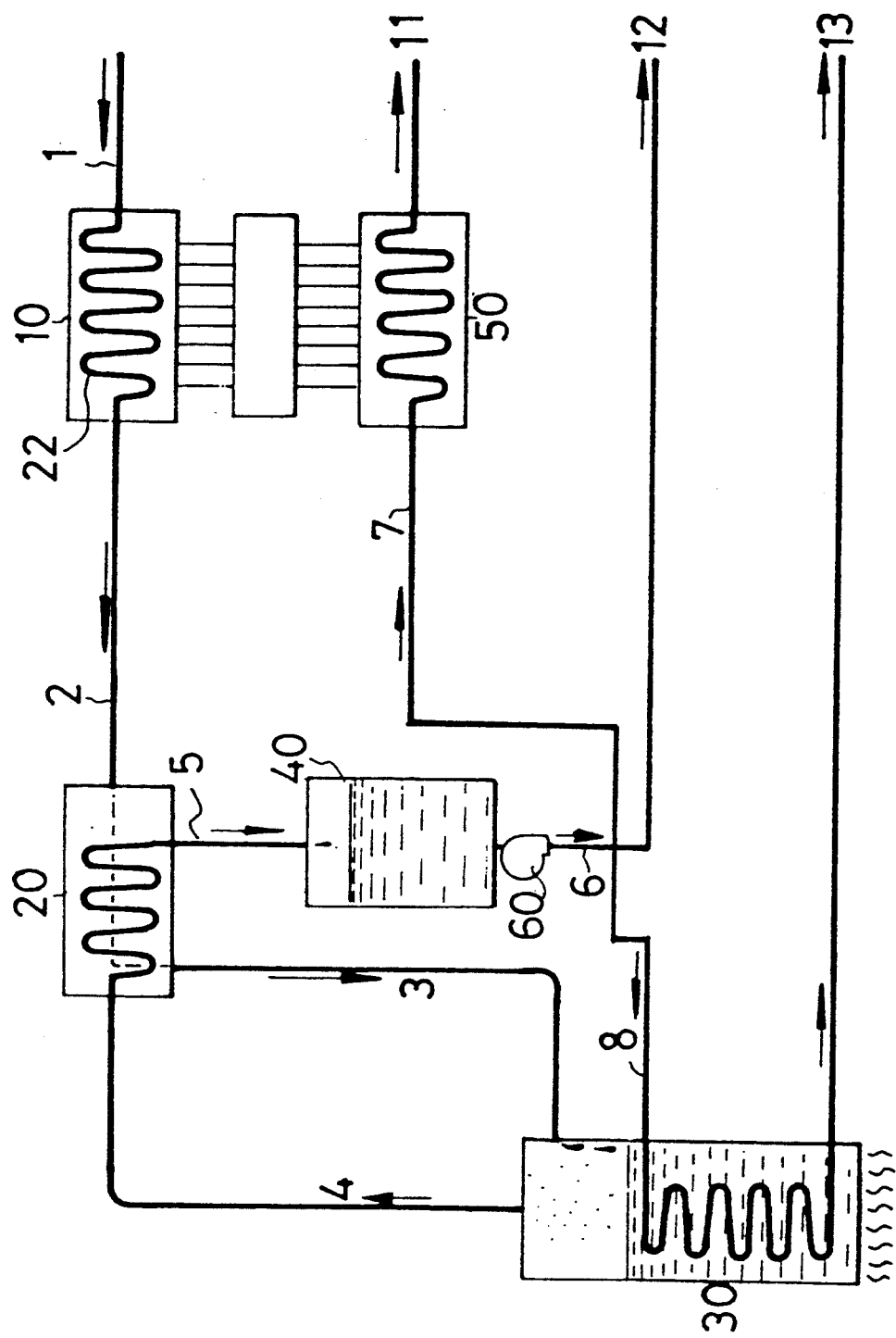
FIG. 2 is the schematic diagram of pipeline layout of an alternative embodiment of this invention.

FIG. 2 shows a schematic diagram of another embodiment of this invention which provides a water pump 60 between the water storage tank 40 and the three water outlet pipes. In case the outlet pipes are located at a level higher than the water storage tank 40, the pump 60 can pump the water in the water storage tank 40 into the outlets for use by the users.

Figure 3:
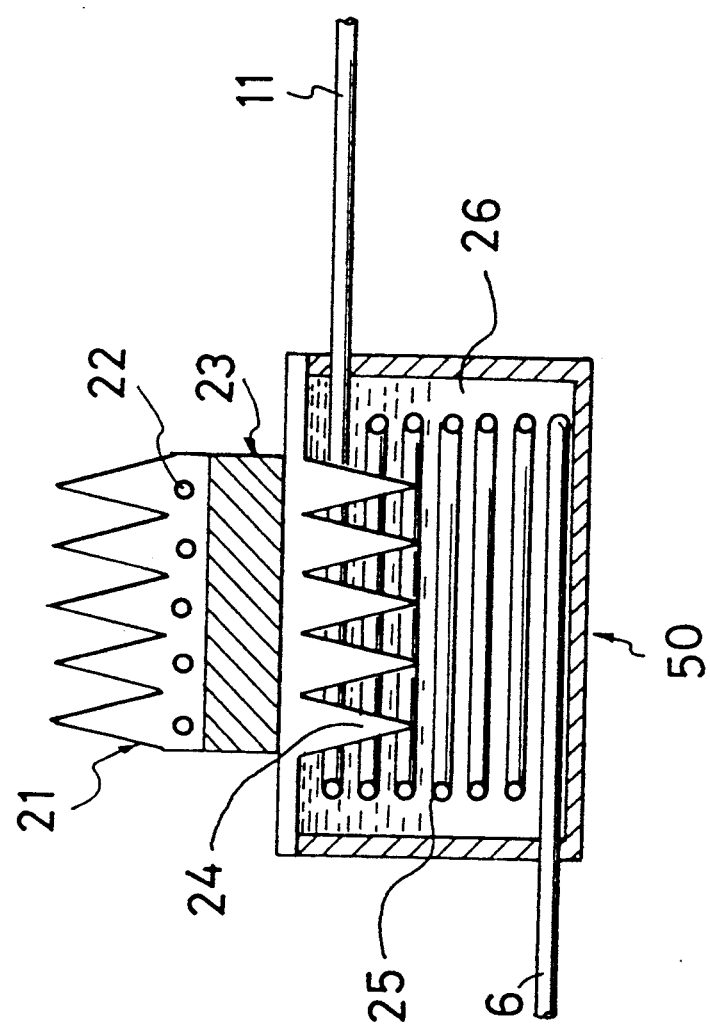
FIG. 3 shows the structure of the electronic chilling device of this invention.

FIG. 3 shows the electronic chilling device used in this invention which consists a radiating fin 21, a cooling pipe 22, an electronic chilling semi-conductor 23, a condensing fin 24, a coil pipe 25 and eutectic melting salt 26. After applying electric power, the electronic chilling semi-conductor 23 in actuated and causes the condensing fin 24 to drop the temperature of the water, and the radiator fin 21 to radiate heat. The temperature of the liquid phase eutectic melting salt 26 contained in the electronic chilling device 50 will drop gradually to a physical state change temperature (preferably 8° C.) whereby the liquid phase eutectic melting salt 26 will be condensed into solid phase which can store a large amount of cold energy. Since the coil pipe 25 is submerged in the eutectic melting salt 26 in device 50, when the distilled water stored in the distilled water storage tank 40 flows through pipe 7 into coil pipe 25, it will absorb the cold energy being stored in the eutectic melting salt 26 and become icy water at a temperature between 7° C. to 12° C. which can be let out through the icy water pipe 11 for use by the users. According to the design of this invention, the eutectic melting salt 26 will turn into either solid phase or solid and liquid co-existence phase during the operation of the water fountain, therefore, the change of the physical state of the eutectic melting salt 26 will enable the salt to store in it a large amount of cold energy whereby the temperature of the icy distilled water can be maintained between 7° C. to 12° C.

In order to save energy by making use of the heat energy radiated by the electronic chilling semi-conductor 23, the softened water in the pre-heating exchanger 10 can be routed through the cooling pipe 22 in the radiation fin 21 so that it will perform the dual functions of cooling the electronic chilling semi-conductor 23 and pre-heating the softened water.

It can be appreciated from the above description that the design of the electronic chilling and cold energy storage device in this invention can recover the heat energy for re-use whereby providing a better energy-saving function than conventional drinking water fountains.

It is further appreciated from the above description that the novel technology disclosed in this invention is capable not only to effectively solve the problems inhering in the conventional drinking water fountains, but also to provide an energy-saving, quiet operating, purifying and highly efficient distilled water fountain. It is apparent that although the invention has been described in connection with preferred embodiments, those skilled in the art may make changes to certain features of the preferred embodiments without departing from the spirit and scope of the invention as defined in the appended claims.

What is claimed is:

1. A distilled water fountain system comprising:
   a water infeed pipe;
   a first heat exchanger for heating water supplied from the water infeed pipe to a temperature above 25° C.;
   a second heat exchanger for re-heating the water flowing out from the said first exchanger to a temperature about 90° C.;
   a first pipe connecting an outlet of the first heat exchanger to an inlet of the second heat exchanger;
   a steam generator for re-heating the water flowing out from said second exchanger to become vaporized steam;
   a second pipe connecting an outlet of the second heat exchanger to an inlet of the stem generator;
   a conduit for permitting said vaporized steam to flow back to the second exchanger, said vaporized steam transferring heat to the water from the first exchanger so as to cause the vaporized steam to be condensed into distilled water;
   a distilled water storage tank for storing the distilled water which exits the second exchanger;
   an electronic chilling device having an electronic chilling semi-conductor and eutectic melting salt, said electronic chilling semiconductor reducing the temperature of the eutectic melting salt to a level at which the physical state of the eutectic melting salt turns into a solid phase or a solid and liquid co-existence phase so that distilled water flowing through a coil pipe submerged in the eutectic melting salt may be cooled into icy water;
   a first outlet pipe being connected to the distilled water storage tank;
   a second outlet pipe coupling the distilled water storage tank to the electronic chilling device; and
   a third outlet pipe being connected to the distilled water storage tank with a portion thereof submerged in the steam generator.

2. The distilled water fountain system according to claim 1, wherein the electronic chilling semi-conductor includes radiating fins extending into said first heat exchanger and condensing fins extending into said eutectic melting salt.

* * * * *